Figure 1:
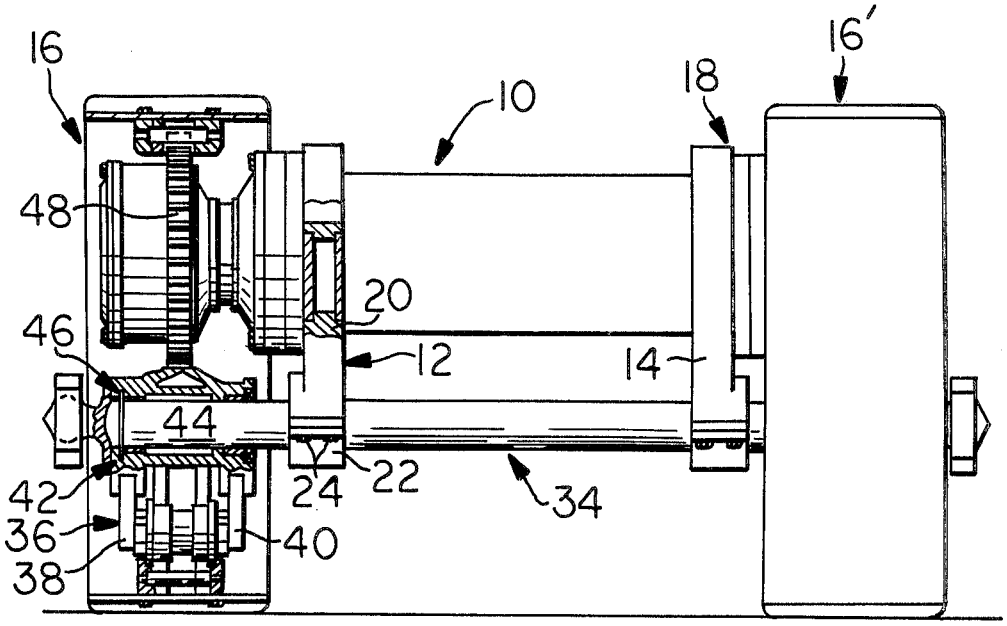
Figure 2:
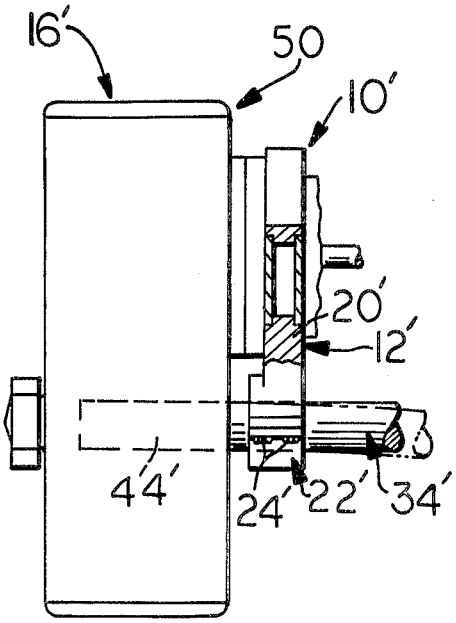
FIG. 2 PRIOR ART
Figure 3:
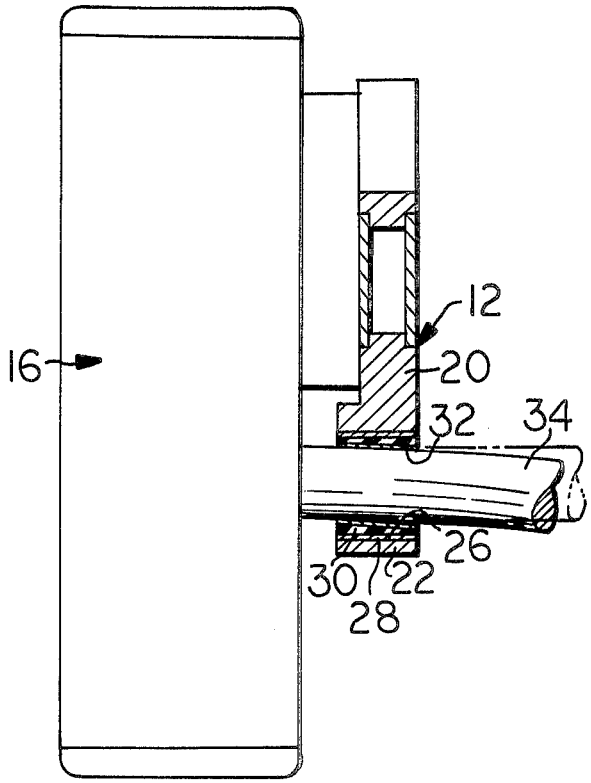

United States Defensive Publication [19] (H) [11] T982,002

Miers [43] May 1, 1979

[54] PIVOT SHAFT BUSHING

[75] Inventor: Bruce W. Miers, Peoria Heights, Ill.

[73] Assignee: Caterpillar Tractor Co., Peoria, Ill.

[21] Appl. No.: 900,465

[22] Filed: Apr. 27, 1978

Related U.S. Application Data

[63] Continuation of Ser. No. 679,419, Apr. 22, 1976, abandoned.

[51] Int. Cl.[2] ..... B62D 11/00

[52] U.S. Cl. ..... 180/9.6; 308/238

[57] ABSTRACT

A track-type vehicle includes a main frame having a transverse shaft mounted thereto, and a pair of laterally spaced track roller assemblies pivotally mounted to the shaft on either side thereof. The shaft is mounted to the main frame by means of elastomeric sleeves disposed about the shaft and positioned in passages defined by the main frame.

6 Claims, 1 Sheet Drawing,

9 Pages Specification

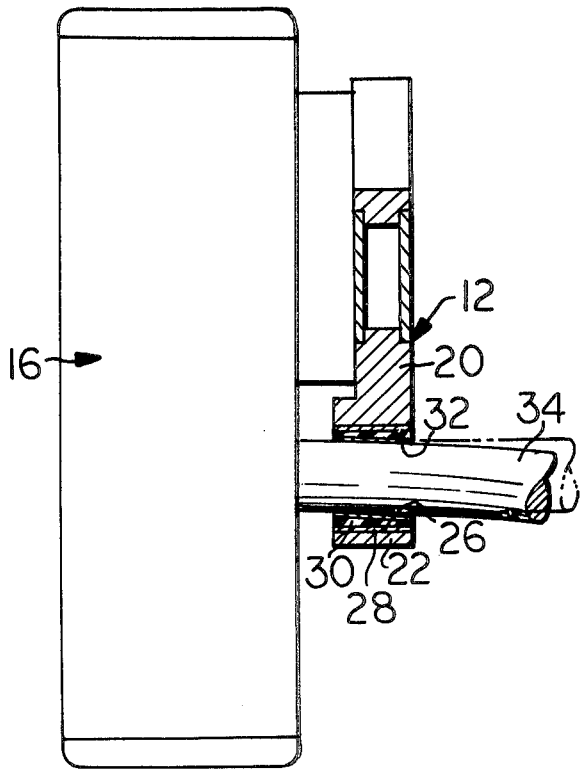

The file of this unexamined application may be inspected and copies thereof may be purchased (849 O.G. 1221, Apr. 9, 1968).